(No Model.)
H. B. MARTIN.
UNDERCUT PLOW AND SUBSOILER.
No. 520,932.　　　　　　　　　　Patented June 5, 1894.
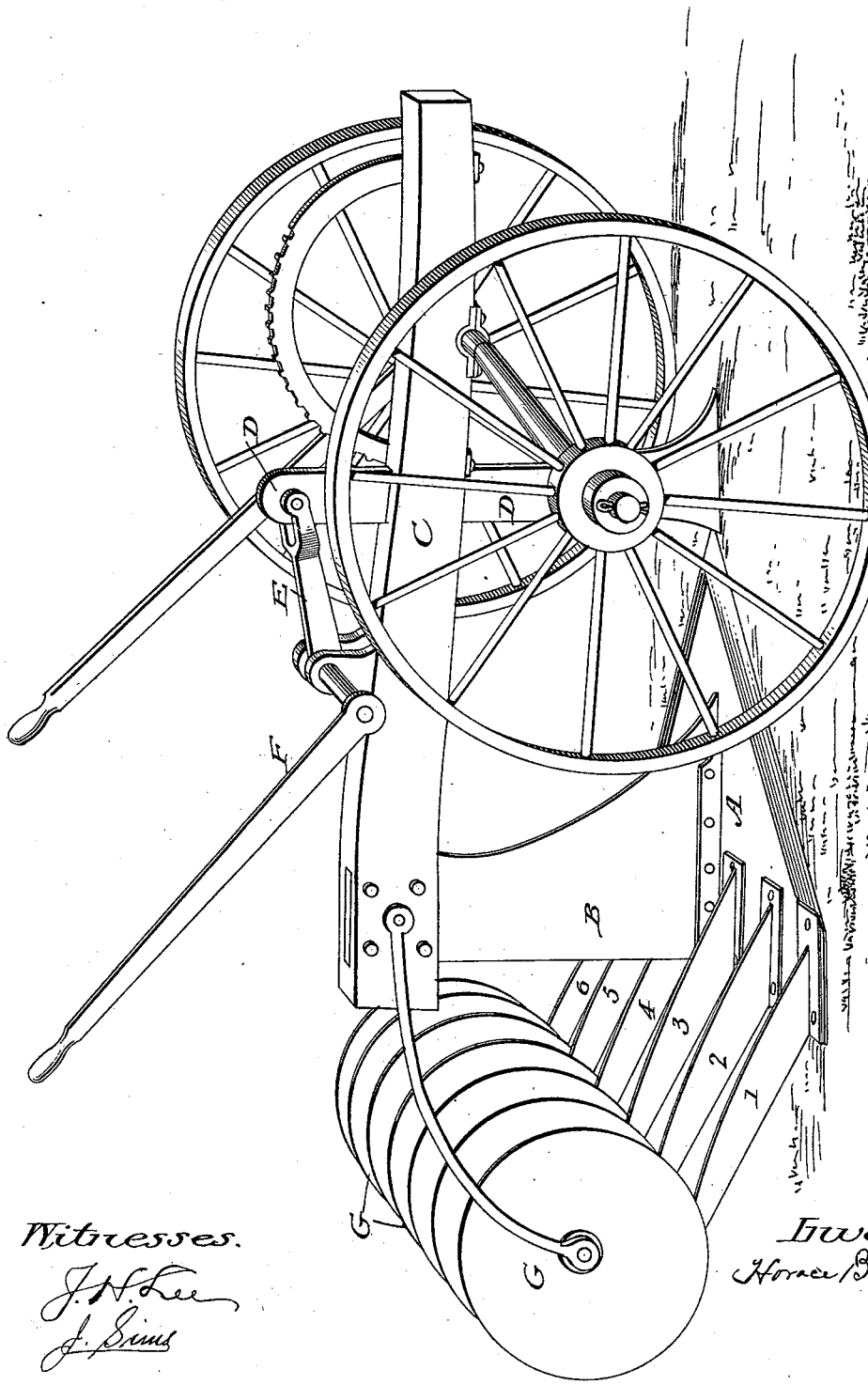
Witnesses.　　　　　　　　　　Inventor.
J. H. Lee　　　　　　　　　　Horace B. Martin
J. Sims

UNITED STATES PATENT OFFICE.

HORACE B. MARTIN, OF CHINO, CALIFORNIA.

UNDERCUT PLOW AND SUBSOILER.

SPECIFICATION forming part of Letters Patent No. 520,932, dated June 5, 1894.

Application filed May 1, 1893. Serial No. 472,652. (No model.)

*To all whom it may concern:*

Be it known that I, HORACE B. MARTIN, a citizen of the United States, and a resident of Chino, in the county of San Bernardino and State of California, have invented a new and useful Combined Undercut Plow and Subsoiler, of which the following is a specification.

The object of my invention is to produce a combined plow and subsoiler to pulverize the ground without turning under the surface portion which has been exposed to the rays of the sun and to the atmosphere, to insure that degree of warmth and fertility necessary to the early and vigorous germination of seeds sown or planted especially in the early spring time; to free the soil from grass roots, stubble and stalks of weeds in which the eggs of cutworms, &c., are deposited, and at the same time, when required, to tap the substratum at regular intervals with an adjustable subsoil attachment; and to effect which I employ the combination set forth in the accompanying drawing, to which reference is made as forming part of this specification, it being a perspective view of the same, corresponding letters and figures representing corresponding parts.

"A" represents a horizontal plate nearly of a triangular form provided with a forward central point and two diagonal cutting edges converging to the central forward point as shown in the figure.

"B" is an upright support or post connecting the plate "A" with a draft frame "C."

"C" is a frame or stock mounted on wheels in the usual manner of constructing plows.

"D" is a narrow subsoil attachment passing through an elongated mortise in the beam and controlled by a lever "F" through a radial arm "E," for which when preferable a colter may be substituted.

"E" is a radial arm firmly attached to the plow beam to sustain the rearward impulsion of the subsoiler "D" when in operation, and to raise and lower the same.

"F" is a lever for controlling the subsoiler "D" to be held in place by the ordinary segment (not shown).

"G" is a follower attached by hinge joints to the beam to press the earth through between a series of knives 1, 2, 3, 4, 5, 6, to fill the displacement. Follower "G" may be a roller, a series of disks set equi-distant from each other or a series of inverted knives, hereinafter described.

"1, 2, 3, 4, 5, 6," are a set of knives set at an incline upward and rearward equi-distant from each other and attached to a horizontal plate "A," to cut through the soil from beneath and extending below the plate "A," inclined backward to pulverize the smooth plane left by plate "A" while the upper portion of the knives will carry grass roots and other débris to the surface. A set of the knives 1, 2, 3, 4, 5, 6, may be attached to a transverse bar, and inverted, and substituted for the follower "G" or its equivalent. Plate "A" may be perforated to different graduations to receive the knives 1, 2, 3, 4, 5, 6, &c., and such perforations used as may locate the knives at a distance apart, best suited, to the requirements of the particular soil under treatment.

Different sets of knives may be provided in which one set shall have a sharp cutting edge where there is no débris to be eliminated, and another set may be provided with smooth slightly rounded edges where it is necessary to carry roots, stubble, &c., to the surface, which by being rendered interchangeable will enable the device to serve the purpose of two or more machines and materially add to its utility.

Operation: The operation of the combined undercut plow and subsoiler, although manifest from the description may be summarized as follows: The plow proper should be set to a medium depth, so that the knives will extend a few inches above the natural level of the ground, and as it passes along it will loosen the soil leaving the surface stratum in its original position, and at the same time the knives 1, 2, 3, 4, 5, 6 will run under the stubble and other débris which follow up the incline and be deposited on the surface. Knives 1 and 6 should be kept well sharpened to act as colters to insure lateral clearance. Where subsoiling is of advantage, the subsoiler "D" may be lowered below the plow proper to tap the substratum at any depth required.

Having thus described my invention, what I believe to be new, and desire to secure by

Letters Patent, is set forth in the following claims:

1. In an undercut plow, the combination with a suitable draft frame, of a pointed horizontal plate or cutter attached to the frame, to run beneath the surface of the ground, provided at its rear end with a transverse series of knives set parallel to the line of motion and inclined upward and rearward, having their cutting edges standing vertically upward to pulverize the soil by cutting through it from beneath, and to bring stubble, straw, roots and other débris to the surface—substantially as described.

2. In an undercut plow, the combination with a suitable draft frame to which is attached a pointed horizontal plate provided with a transverse series of knives set parallel to the line of motion and inclined upward and rearward, of a follower attached to the rear part of the frame to force the earth down between the knives to insure their more perfect action—substantially as described.

3. In an undercut plow, the combination with a suitable draft frame to which are attached a horizontal plate to run beneath the surface of the ground provided with a series of knives inclined upward and rearward and a follower attached to the frame and located above the knives, of a subsoil blade properly attached to the frame—the whole constructed and arranged substantially as and for the purposes set forth.

HORACE B. MARTIN.

Witnesses:
A. D. FRASER,
J. SIMS.